United States Patent
Schlüter

(10) Patent No.: US 6,681,680 B2
(45) Date of Patent: Jan. 27, 2004

(54) VACUUM BRAKE BOOSTER WITH MECHANICAL EMERGENCY BRAKING AID

(75) Inventor: Peter Schlüter, Kammerforst (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 10/274,008

(22) Filed: Oct. 18, 2002

(65) Prior Publication Data

US 2003/0037667 A1 Feb. 27, 2003

Related U.S. Application Data

(63) Continuation of application No. PCT/EP01/04188, filed on Apr. 11, 2001.

(30) Foreign Application Priority Data

Apr. 19, 2000 (DE) .......................................... 100 19 424

(51) Int. Cl.$^7$ ................................................ F15B 9/10
(52) U.S. Cl. .......................................... 91/367; 91/369.2
(58) Field of Search ............................ 91/369.2, 369.3, 91/376 R, 367

(56) References Cited

U.S. PATENT DOCUMENTS

| 6,186,042 B1 | * | 2/2001 | Levrai et al. | ............... | 91/369.2 |
| 6,408,738 B1 | | 6/2002 | Harth et al. | ............... | 91/369.2 |
| 2001/0003947 A1 | | 6/2001 | Schluter | .................... | 91/376 R |

FOREIGN PATENT DOCUMENTS

| DE | 198 31 962 | 1/2000 |
| DE | 198 41 150 | 3/2000 |
| JP | 09175373 | 7/1997 |
| WO | 00/07862 | 2/2000 |

OTHER PUBLICATIONS

Document Bibliography and Abstract for DE19841150 from the http://l2.espacenet.com/espacenet/viewer?PN=DE19841150&CY=ep&LG=en&DB=EPD, printed Sep. 24, 2002.
Document Bibliography and Abstract for WO0007862 from the http://l2.espacenet.com/espacenet/viewer?PN=WO0007862&CY=ep&LG=en&DB=EPD, printed Sep. 24, 2002.

* cited by examiner

Primary Examiner—F. Daniel Lopez
(74) Attorney, Agent, or Firm—MacMillan, Sobanski & Todd, LLC

(57) ABSTRACT

A vacuum brake booster (10) is described, comprising a vacuum chamber (16) and a working chamber (18) separated from each other by a movable wall (14). The vacuum brake booster (10) includes an emergency braking aid comprising a permanent magnet (38), which is disposed in the control valve housing (22), and an armature (36A) which cooperates with the permanent magnet (38) and in the event of emergency braking is drawn into abutment with the permanent magnet (38), with the result that a control valve (20) is held open for the supply of atmospheric pressure or above-atmospheric pressure to the working chamber (18). The permanent magnet (38) and the armature (36A) form a two-component magnetic module (36A, 38), of which a first component is rigidly coupled to an actuating piston (28) of the brake booster (10). A coupling device (66) is provided which is adapted to couple the second component of the magnetic module (36A, 38), at least in actuating direction, to the actuating piston (28) in response to high reaction forces.

17 Claims, 7 Drawing Sheets

US 6,681,680 B2

VACUUM BRAKE BOOSTER WITH MECHANICAL EMERGENCY BRAKING AID

CROSS REFERENCE TO RELATED APPLICATIONS

This application is a continuation of International Application No. PCT/EP01/04188 filed Apr. 11, 2001, which claimed priority to German Patent Application No. 10019424.9 filed Apr. 19, 2000, the disclosures of which are incorporated herein by reference.

BACKGROUND OF THE INVENTION

The invention relates to a vacuum brake booster comprising a vacuum chamber and a working chamber separated from each other by a movable wall, a control valve which comprises a housing coupled workingly to said movable wall and which is capable of controlling the supply of atmospheric pressure or above-atmospheric pressure to the working chamber to achieve a pressure difference at the movable wall, and an emergency braking aid having a permanent magnet, which is disposed in the control valve housing, and an armature, which cooperates with the permanent magnet and in the event of emergency braking is drawn into abutment with the permanent magnet, with the result that the control valve is held open for the supply of atmospheric pressure or above-atmospheric pressure to the working chamber. The permanent magnet and the armature form a two-component magnetic module wherein a first component of the magnetic module is rigidly coupled to an actuating piston in actuating direction and a second component of the magnetic module is adapted to be coupled to the actuating piston at least in the actuating direction of the brake booster. In the context of the present invention, the term "actuating direction" always means the actuating direction of the brake booster.

Vacuum brake boosters have been known for quite some time and millions of them are being used to boost the actuating forces of a vehicle hydraulic brake system and therefore keep said forces at a level which is acceptable to the driver of a vehicle. Likewise known are so-called emergency braking aids, which are frequently also referred to as "brake assistants". These are devices which provide a driver in the event of an emergency braking situation with increased braking power for substantially the same actuating force.

Emergency braking aids may be divided into electromagnetically actuated and mechanically actuated systems. For reasons of cost, the use of a mechanical system is desired for applications in vehicles at the lower end of the price range.

A vacuum brake booster having such a mechanical emergency braking aid is known, for example, from WO 00/07862, corresponding U.S. Patent Application Publication 2001/0003947 A1 which is incorporated by reference herein. Said vacuum brake booster has a vacuum chamber and a working chamber separated from each other in a pressure-proof manner by a movable wall. A control valve, which has a housing coupled workingly to the movable wall, comprises an atmospheric valve seat which, to achieve a pressure difference at the movable wall, is capable of controlling the supply of atmospheric pressure to the working chamber in dependence upon the displacement of an input element of the brake booster. The input element is coupled in actuating direction to an actuating piston.

For improved boosting of the braking force in emergency braking situations, a mechanical emergency braking aid is disposed in the control valve housing. The emergency braking aid includes a two-component armature comprised of a permanent magnet and an armature. In the actuating direction, the armature cooperating with the permanent magnet is rigidly coupled to the input element via the actuating piston. A coupling device makes it possible to couple the armature to the permanent magnet in such a manner that the axial distance between the armature and the permanent magnet does not change as a braking operation commences.

The armature is resiliently preloaded counter to the actuating direction of the brake booster and, in the starting position of the control valve, is held at a first distance from the permanent magnet. In the course of an approach towards the permanent magnet, the armature, when it is less than a predetermined second distance away, which is smaller than the first distance, is pulled by the permanent magnet counter to the resilient preloading force acting upon the armature and with simultaneous cancellation of its, in actuating direction, rigid coupling to the input element into abutment with the permanent magnet.

The movement of the armature is transmitted to a valve sleeve, which is rigidly coupled to the armature and on its end facing the input element carries the atmospheric valve seat. When the emergency braking aid is activated, because of the coupling of armature and permanent magnet, the atmospheric valve is held open to the maximum extent. The maximum possible pressure difference therefore builds up, with the result that the maximum possible boosting force of the brake booster is achieved.

To deactivate an activated emergency braking aid, the actuating force summoned up by the driver has to be reduced. As a result of the reduction of the actuating force summoned up by the driver, the actuating piston moves counter to actuating direction and a catch rigidly coupled to the actuating piston separates the armature from the permanent magnet.

So long as the full-output pressure of the brake booster, i.e. the maximum pressure difference at the movable wall, is not attained, a defined actuating speed excess is needed to move the armature closer than the second distance to the permanent magnet and hence achieve the coupling of armature and permanent magnet. However, once the full-output pressure is attained, a further increase of the actuating force summoned up by the driver is, independently of the actuating speed, always combined with an approach of armature and permanent magnet. Thus, even if the actuating force is increased slowly, e.g. when a vehicle is stopped at traffic lights, after the full-output pressure is attained an inappropriate coupling of armature and permanent magnet may occur. The emergency braking aid is activated even though an emergency braking situation does not exist.

To deactivate the inappropriately activated emergency braking aid, the driver—just as in the case of appropriate activation after emergency braking—has to ease off the brake pedal to a relatively large extent before the brake booster drops back to its original performance characteristic and may once more be apportioned in the usual manner by the driver.

The driver is not accustomed to the departure from the usual performance characteristic which occurs upon activation of the emergency braking aid in non-emergency braking situations and he therefore perceives it to be a disadvantage.

SUMMARY OF THE INVENTION

The object of the invention is to provide a brake booster with a mechanical emergency braking aid, in which activation of the emergency braking aid may be effected only in emergency braking situations.

Proceeding from a brake booster of the type described initially, said object is achieved according to the invention in that a coupling device is provided, which may couple the second, as yet uncoupled component of the magnetic module at least in actuating direction of the brake booster to the actuating piston, when increased reaction forces are introduced counter to the actuating direction of the brake booster into the coupling device.

In a non-emergency braking situation, i.e. in the case of e.g. a slow increase of the actuating force, both the armature and the permanent magnet are coupled at least in actuating direction to the actuating piston by the coupling device. As a result of the simultaneous coupling of both armature and permanent magnet to the actuating piston the mutual distance of the two components of the magnetic module cannot be reduced any further. Armature and permanent magnet are therefore prevented from moving so close to one another that they are less than the previously mentioned second distance apart and a coupling of armature and permanent magnet occurs.

According to the invention, the hydraulic reaction forces of the master brake cylinder acting counter to actuating direction upon the actuating piston are used as a criterion for the existence of an emergency braking situation. Given a comparatively slow increase of the actuating force summoned up by the driver, i.e. in a non-emergency braking situation, the reaction forces of the master brake cylinder are relatively high. In said case, as a response to the high reaction forces, so to say, the coupling device is activated by them and the magnetic module component not yet coupled to the actuating piston is coupled, at least in actuating direction, to the actuating piston. An inappropriate activation of the emergency braking aid is ruled out in this event.

In the case of a fast actuation of the brake system which is typical of emergency braking situations, on the other hand, the reaction forces of the master brake cylinder are initially still comparatively low. The coupling device consequently remains deactivated and the emergency braking aid may cut in in the usual manner.

According to a preferred embodiment, a mechanical coupling device is provided. The reaction forces of the master brake cylinder advantageously act counter to actuating direction upon the mechanical coupling device so that the second, as yet uncoupled component of the magnetic module is coupled at least in actuating direction to the actuating piston, e.g. when the reaction forces exceed a specific threshold. The coupling device is in said case preferably disposed workingly between the actuating piston and a component of the brake booster which introduces the reaction forces of the master brake cylinder into the brake booster. According to the principle "actio=reactio", the coupling device is then acted upon not only by the actuating force acting in actuating direction summoned up by the driver but also by the reaction force of the master brake cylinder acting counter to the actuating direction.

The coupling of the magnetic module component, which is not yet coupled to the actuating piston, is preferentially effected by means of a clamping joint to the actuating piston. But different constructions of the coupling device are also possible. For example, the coupling device may comprise latch or catch elements to couple the still uncoupled magnetic module component to the actuating piston.

In case a clamping connection is provided for coupling the still uncoupled component of the magnetic module component to the actuating piston, the coupling device may comprise a clamping element which is deformable radially to the outside relative to a longitudinal axis of the control valve housing by a force acting in actuating direction, for example. The clamping element is preferably disposed, in actuating direction, downstream of the actuating piston and connected workingly to the latter. At least some of the force needed to deform the clamping element may therefore be summoned up by the actuating piston.

According to a preferred embodiment, the deformable regions of the clamping element take the form of fingers, which extend parallel to the longitudinal axis of the control valve housing and all of which concentrically surround said longitudinal axis. The fingers in turn may be connected at their ends facing the vacuum chamber to a common carrier part, which is disposed downstream of the actuating piston.

A component disposed e.g. between the actuating piston and the clamping element and provided with sloping surfaces may be used to deform the clamping element. Instead of providing a separate component having sloping surfaces, the sloping surfaces may also be disposed on the actuating piston radially at the outside.

The coupling device is actuated through cooperation of the sloping surfaces (e.g. conical surfaces) with the deformable regions of the clamping element e.g. in the form of fingers. For said purpose, a reduction of the distance between the component provided with sloping surfaces and the clamping element is normally required. The sloping surfaces are preferably inclined relative to a longitudinal axis of the control valve housing.

A resilient element is preferably disposed between the clamping element and the component provided with sloping surfaces in such a way as to counteract a convergence of both components. The control valve housing may have a step acting counter to the actuating direction as a stop for the component provided with sloping surfaces. A sensing disk, which cooperates with a reaction disk disposed between a reaction piston of the vacuum brake booster and the control valve housing, is preferably disposed in actuating direction downstream of the clamping element.

The clamping means may further comprise an extension, which is coupled in actuating direction to the as yet uncoupled component of the magnetic module, cooperates with the clamping element and radially concentrically surrounds the outside of the clamping element at least in sections. In the case of radially outward deformation of the clamping element, the deforming regions of the clamping element come into abutment with the portion of the extension radially surrounding the outside of the clamping element. The coupling of said components to the actuating piston is effected as a result of the clamping element coming into abutment with the extension of the as yet uncoupled component of the magnetic module. The extension is preferably preloaded in actuating direction relative to the component of the magnetic module to be coupled, in order to allow a certain relative motion between said component and the extension.

The as yet uncoupled component of the magnetic module is preferably connected by a screw connection in an axially adjustable manner to a holding device. The holding device in turn may be preloaded by means of a resilient element counter to the actuating direction towards a step of the control valve housing. The step of the control valve housing prevents a movement of the component to be coupled of the magnetic module counter to the actuating direction. The resilient element, on the other hand, allows a certain displacement of the component to be coupled of the magnetic module in actuating direction.

The holding device for the uncoupled component of the magnetic module is preferably connected rigidly counter to the actuating direction and resiliently in actuating direction to the extension cooperating with the clamping element. To said end, the holding device may, for example, be provided radially at the inside with a groove. The extension may have a collar projecting into the groove; a resilient element disposed between a side surface of the groove facing the vacuum chamber and an opposing face end of the collar advantageously preloads the holding device and the extension towards one another.

DETAILED DESCRIPTION OF THE INVENTION

Figure 1:
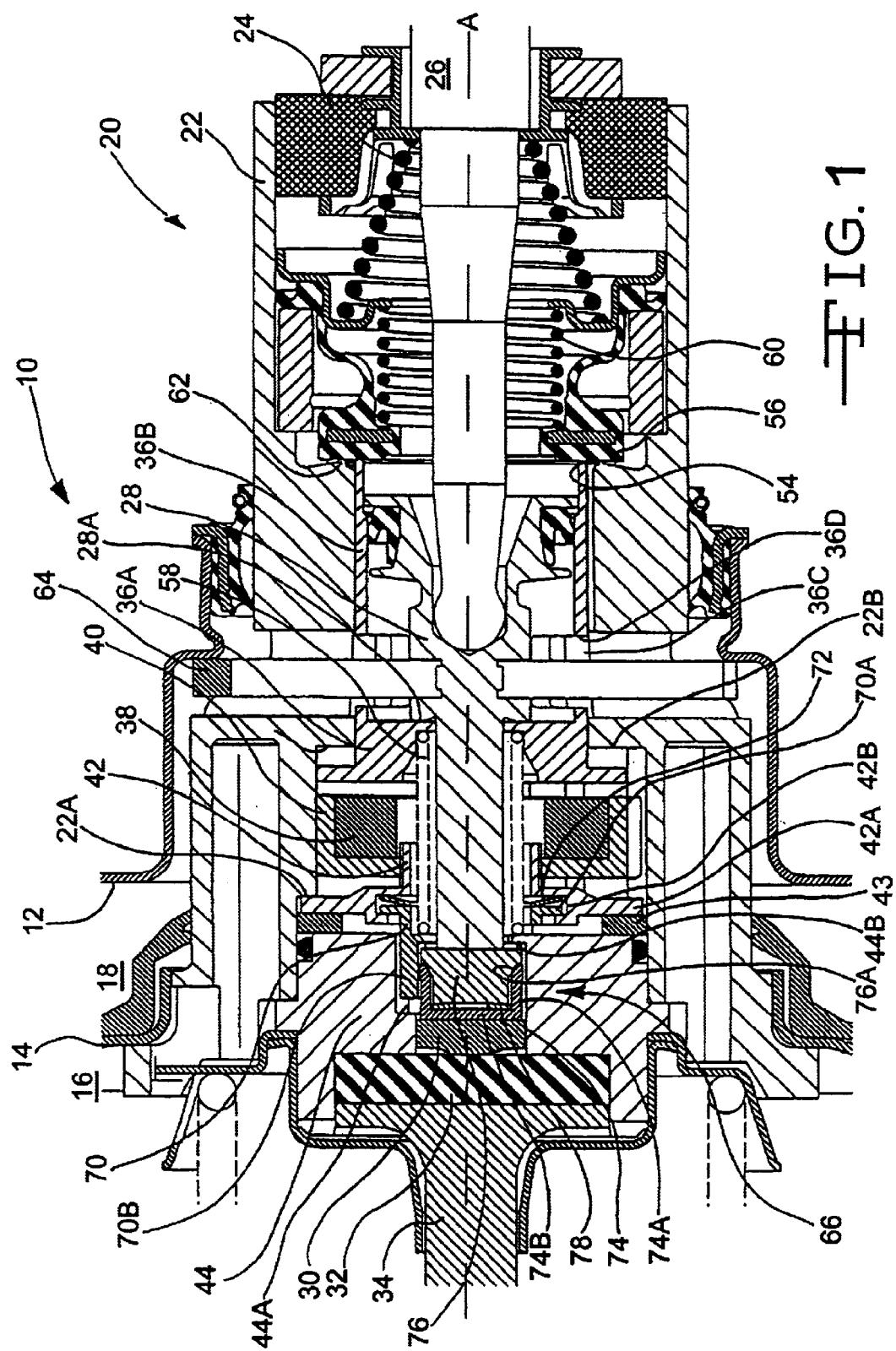
FIG. 1 a longitudinal section through the control valve of a first embodiment of a vacuum brake booster according to the invention in a standby position.

FIG. 1 shows a first embodiment of a vacuum brake booster 10 according to the invention having a housing 12 in which a movable wall 14 separates a vacuum chamber 16 in a pressure-proof manner from a working chamber 18.

During operation of the brake booster 10 the vacuum chamber 16 is constantly connected to a vacuum source, e.g. to the intake tract of an internal combustion engine or to a vacuum pump. A control valve 20 having a housing 22 may optionally connect the working chamber 18 to the vacuum chamber 16, in order to evacuate the working chamber 18, or the evacuated working chamber 18 to the ambient atmosphere, i.e. the ambient pressure, in order to generate a pressure differential at the movable wall 14. The movable wall 14 is coupled workingly to the control valve housing 22.

The brake booster 10 is operated by means of a rod-shaped input element 26, which is preloaded into its starting position by a spring 24, projects along an axis A into the control valve housing 22 and is fixed by its one, spherically designed end in an actuating piston 28.

The end of the actuating piston 28 opposite the spherically designed end of the input element 26 is in contact via a coupling device 66 with a sensing disk 30 that transmits an actuating force, which is introduced via the input element 26 into the brake booster 10, via a reaction disk 32 made of elastomeric material, to a reaction piston 34 of a master cylinder, disposed functionally downstream of the brake booster 10 and not shown here, of a vehicle hydraulic brake system. The reaction disk 34 brings together the actuating force summoned up by the driver and the boosting force.

The actuating piston 28 penetrates a circular armature 36A arranged concentrically with it and an annular permanent magnet 38 which is likewise arranged concentrically with the actuating piston 28 and accommodated in a pot-shaped component 40.

The pot-shaped component 40 accommodating the permanent magnet 38 is connected, via a central internal thread, in an axially adjustable manner to a holding device in the form of a hollow-cylindrical retaining ring 42 having a complementary external thread. The retaining ring 42 has a flange-shaped portion of enlarged diameter 42A, which rests with a part of its surface facing the input element 26 against a step 22A of the control valve housing 22.

The control valve housing 22 is closed off at a side opposite the input element 26 by a control valve housing insert 44. An annular resilient element 43 is disposed between a surface—facing the vacuum chamber 16—of the flange-shaped portion of enlarged diameter 42A of the retaining ring 42 and an end face—facing the input element 26—of the control valve housing insert 44. The resilient element 43, which is made of an elastomeric material, allows a defined displacement in actuating direction of the retaining ring 42 and/or of the pot-shaped component 40 that is coupled to the retaining ring 42 and accommodates the permanent magnet 38.

The inside diameter of the retaining ring 42 has an annular groove 42B at its end facing the vacuum chamber 16. A collar 70A of an extension 70, which extends from the retaining ring 42 in the direction of the vacuum chamber 16, projects into said annular groove 42B. Between a side surface—facing the vacuum chamber 16—of the groove 42B and an end face—facing the input element 26—of the collar 70A of the extension 70 a spring element 72 is disposed in such a way that the collar 70A is preloaded in actuating direction. The extension 70 is therefore connected to the holding device 42 rigidly in actuating direction and resiliently counter to actuating direction.

The extension 70 comprises a series of portions 70B in the form of cylinder envelope segments that extend into a central recess 44A of the control valve housing insert 44. In FIG. 1 only a single portion 70B is illustrated. Said portions 70B of the extension 70 cooperate with fingers 74A of a clamping element 74. FIG. 1 shows two such fingers 74A, which extend parallel to the housing longitudinal axis A and concentrically surround said axis. The fingers 74A are connected at their ends facing the vacuum chamber 16 to a common carrier part 74B. The clamping element 74 therefore has a substantially pot-shaped configuration with the side walls of the pot have recesses in the region between the individual fingers 74A, however.

The sensing disk 30 is disposed in actuating direction downstream of the clamping element 74. Situated in actuating direction upstream of the clamping element 74 is a conical component 76, which in actuating direction cooperates, via its conical portion 76B, with the fingers 74A and, via its end face facing the vacuum chamber 16, via a resilient element 78 with the carrier part 74B.

When the conical component 76 penetrates the interior of the pot-shaped clamping element 74, the fingers 74A of the clamping element 74 are bent radially outwards by the conical portion 76B of the conical component 76, the cross section of which decreases in actuating direction. At the same time, the resilient element 78 disposed in actuating direction upstream of the conical component 76 is correspondingly deformed.

The armature 36A cooperating with the permanent magnet 38 is designed as an integral part of an axially displaceable valve sleeve 36B guided in the control valve housing. The armature 36A has a collar facing radially inwards and cooperating with a return spring 58. The preloaded return spring 58 cooperates with the control valve housing insert 44 firmly connected to the control valve housing 22 and preloads the armature 36A and the valve sleeve 36B counter to the actuating direction of the input element 26 towards a shoulder 28A of the actuating piston 28. The armature 36A is consequently coupled rigidly to the actuating piston 28 in actuating direction.

A first annular valve seat 54 of the control valve 20 is formed on the free end of the valve sleeve 36B. The first valve seat 54 cooperates with valve sealing element 56 which is also annular and preloaded towards it by a spring 60 and is adapted to control the connection between the ambient atmosphere and the working chamber 18 of the brake booster 10. Formed radially outside of and concentrically with the first valve seat 54 and at the inside of the control valve housing 22 is a second annular valve seat 62 of the control valve 20, which valve seat likewise cooperates with the valve sealing element 56 and is adapted to control the connection between the vacuum chamber 16 and the working chamber 18 of the brake booster 10.

Upon operation of the brake booster, the first valve seat 54 of the control valve 20 in dependence upon the displacement of the input element 26 relative to the control valve housing 22 is opened to a greater or lesser extent, thereby generating a corresponding boosting force of the brake booster 10, which results from the pressure differential actually effective at the movable wall 14.

When actuation of the input element 26 is effected quickly and with a relatively large stroke, in the manner typical of an emergency braking operation, the armature 36A moves so close to the permanent magnet 38 that the force of the compression spring 58 is no longer sufficient to keep the armature 36A away from the permanent magnet 38. The force exerted by the permanent magnet 38 upon the armature 36A is then preponderant. The armature then detaches itself from the input element 26 and comes into abutment with the permanent magnet 38. The valve sleeve 36B integrally constructed with the armature 36A also participates in said movement of the armature 36A so that the valve seat 54, as a result of the coupling of armature 36A and permanent magnet 38, is held open to the maximum extent. The emergency braking aid is therefore activated and the maximum possible boosting force of the brake booster 10 is made available. Said operating position of the brake booster 10 with activated emergency braking aid is shown in FIG. 2.

Since in an emergency braking situation the reaction forces of the master brake cylinder at the start of braking are still relatively low, the actuating force summoned up by the driver and introduced via the actuating piston 28 into the conical component 76 is transmitted without much resistance via the resilient element 78 to the clamping element 74 and from the clamping element 74 to the sensing disk 30. The reaction forces are consequently insufficient to set up a resistance to the actuating forces summoned up by the driver which would lead to deformation of the clamping element 74 and coupling of the permanent magnet 38 in actuating direction to the actuating piston 28. The coupling device remains deactivated.

Figure 2:
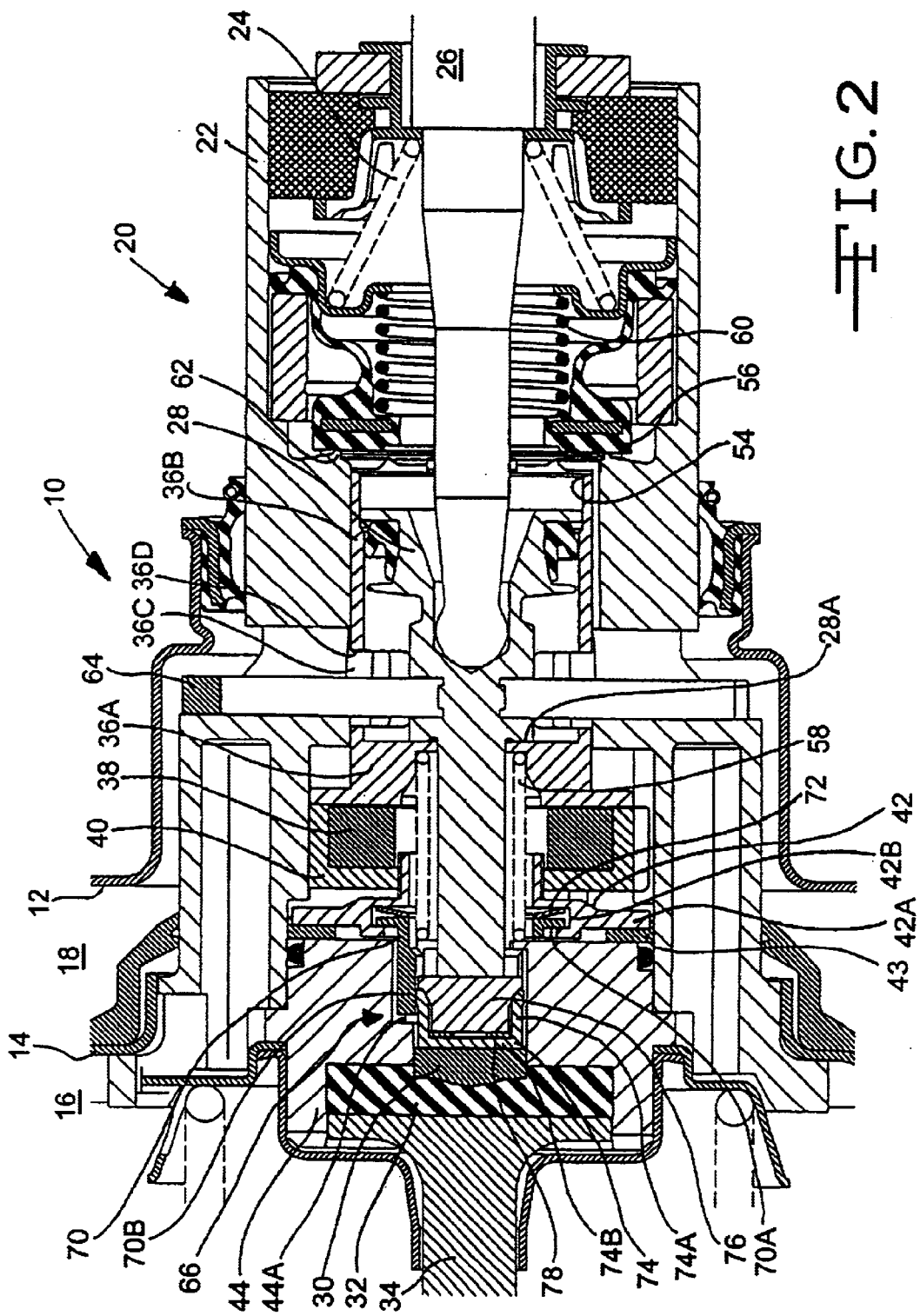
FIG. 2 the control valve of FIG. 1 with the emergency braking aid activated.

In order to release the brake from the operating position shown in FIG. 2 and deactivate the emergency braking aid, the actuating force summoned up by the driver has to be reduced. During a reduction of the actuating force summoned up by the driver, the return stroke of the input element 26 is assisted by the return springs 24 and 58. Because of the return stroke of the input element 26, a locking bar 64 rigidly coupled to the actuating piston 28 and extending through a recess 36C of the valve sleeve 36B comes into contact with a face end 36D of the valve sleeve 36B. Upon a further increase of the return stroke, therefore, the return forces of the return springs 24 and 58 are transmitted via the locking bar 64 to the valve sleeve 36B and to the armature 36A rigidly coupled to the valve sleeve 36B, with the result that the armature 36A finally detaches from the permanent magnet 38. The emergency braking aid is deactivated.

Figure 3:
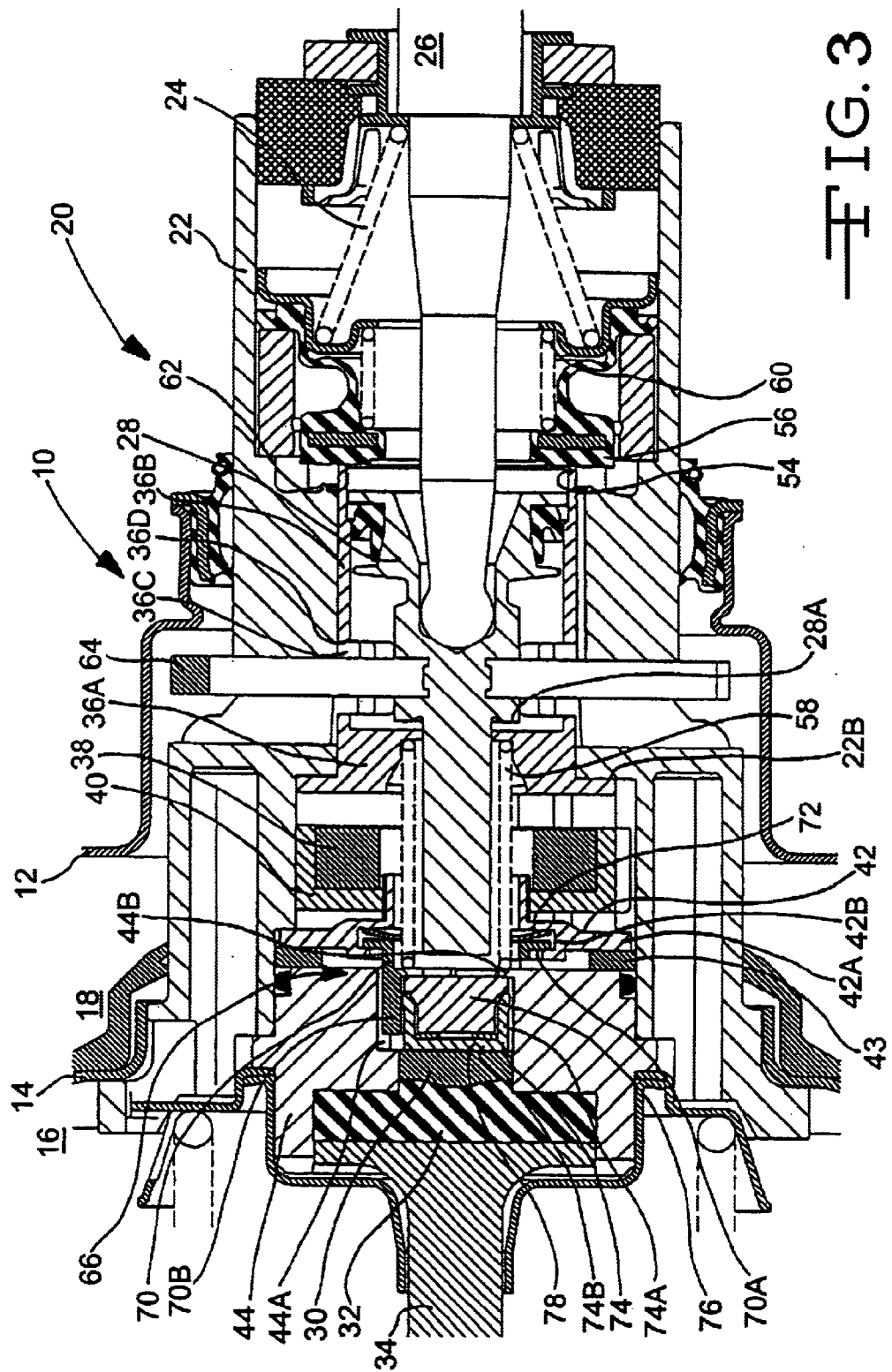
FIG. 3 the control valve of FIG. 1 in release position after deactivation of the emergency braking aid.

Said operating position of the brake booster with the brake released upon completion of the return stroke of the input element 26 is shown in FIG. 3.

As a result of the return stroke of the actuating piston 28 the valve sleeve 36B rigidly coupled to the armature 36A is displaced by the return spring 58 counter to actuating direction and preloaded towards a step 22B of the control valve housing 22. The first valve seat 54 subsequently comes into contact with the valve sealing element 56 and displaces the latter likewise counter to actuating direction. The second valve seat 62 is therefore opened and a connection established between the working chamber 18 and the vacuum chamber 16. The working chamber 18 is evacuated and the initial state shown in FIG. 1 arises.

In the operating position of the brake booster 10 shown in FIG. 3 the conical component 76 has already detached itself from the actuating piston 28 because further displacement of the conical component 76 counter to the actuating direction is prevented by a stop 44B of the control valve housing insert 44.

When, from the standby position of the brake booster 10 shown in FIG. 1, the actuating force summoned up by the driver is increased slowly, i.e. an emergency braking situation does not exist, progressively higher reaction forces of the master brake cylinder counteract actuation and finally lead to activation of the coupling device.

Figure 4:
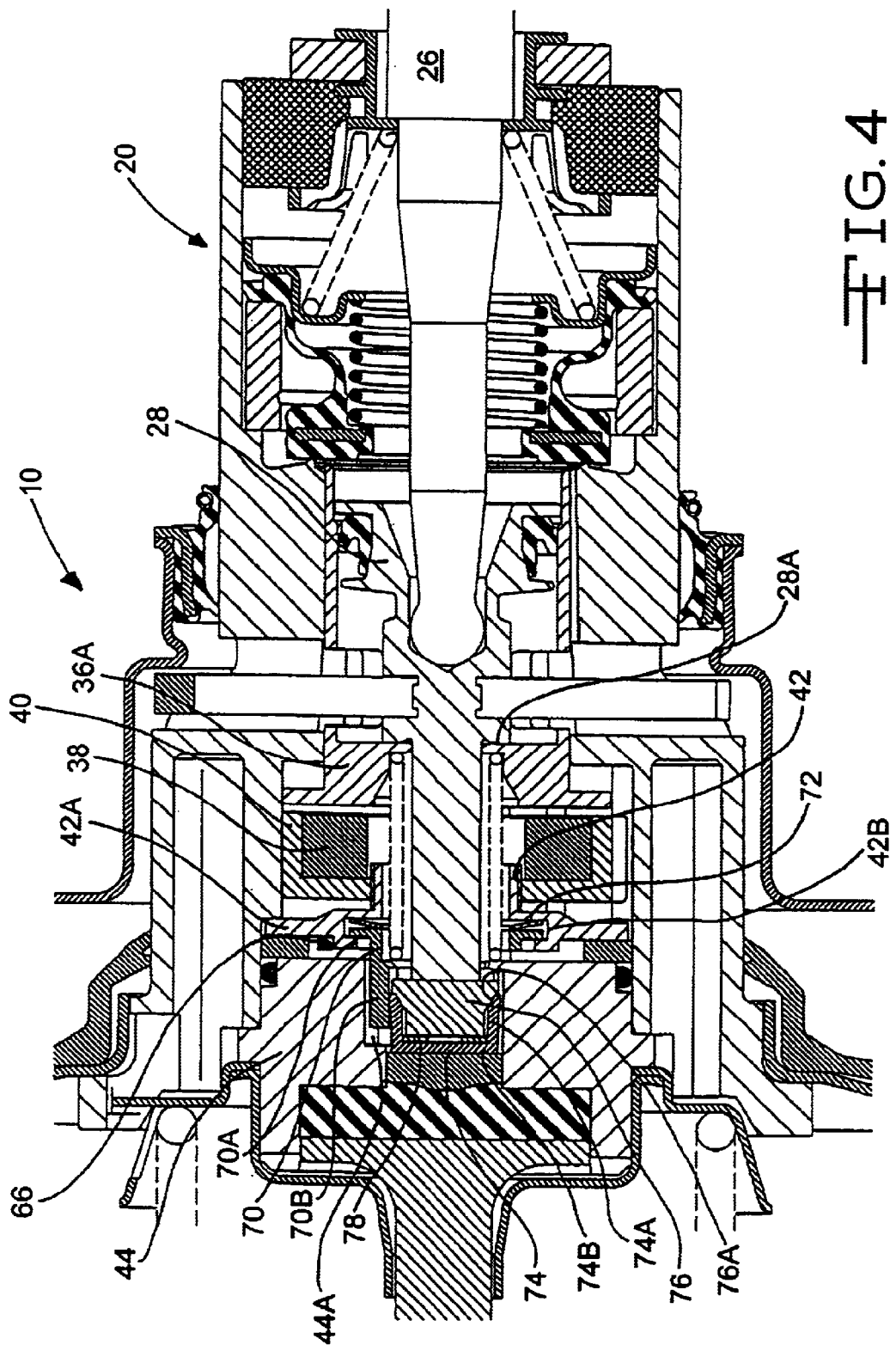
FIG. 4 the control valve of FIG. 1 on attaining the full-output pressure in a normal braking position.

FIG. 4 shows the brake booster 10 of FIG. 1 upon attaining the full-output pressure in a normal braking position with the coupling device activated. The armature 36A has already moved so close to the permanent magnet 38 that further displacement of the armature 36A in actuating direction would lead to an undesired coupling of armature 36A and permanent magnet 38. In such an actuating position of the brake booster 10, the coupling device is activated.

Because in said state the reaction forces of the master brake cylinder are high, the resilient element 72 disposed between the clamping element 74 and the conical component 76 is deformed upon a further displacement of the actuating piston 28 in actuating direction. The conical component 76 then penetrates even further into the clamping element 74 so that the fingers 74A of the clamping element 74 are bent radially outwards by the conical portion 76A of the conical component 76. The fingers 74A then become jammed with the inside diameters of the portions 70B of the extension 70 extending into the recess 44A of the control valve housing insert 44. The permanent magnet 38 is consequently coupled via the pot-shaped component 40, the holding device 42, the extension 70, the clamping element 74 and the conical component 76 in actuating direction rigidly to the actuating piston 28. Because the armature 36A is also coupled via a stop 28A of the actuating piston 28 rigidly to the latter, the distance between the armature 36A and the permanent magnet 38 cannot be reduced further.

Figure 5:
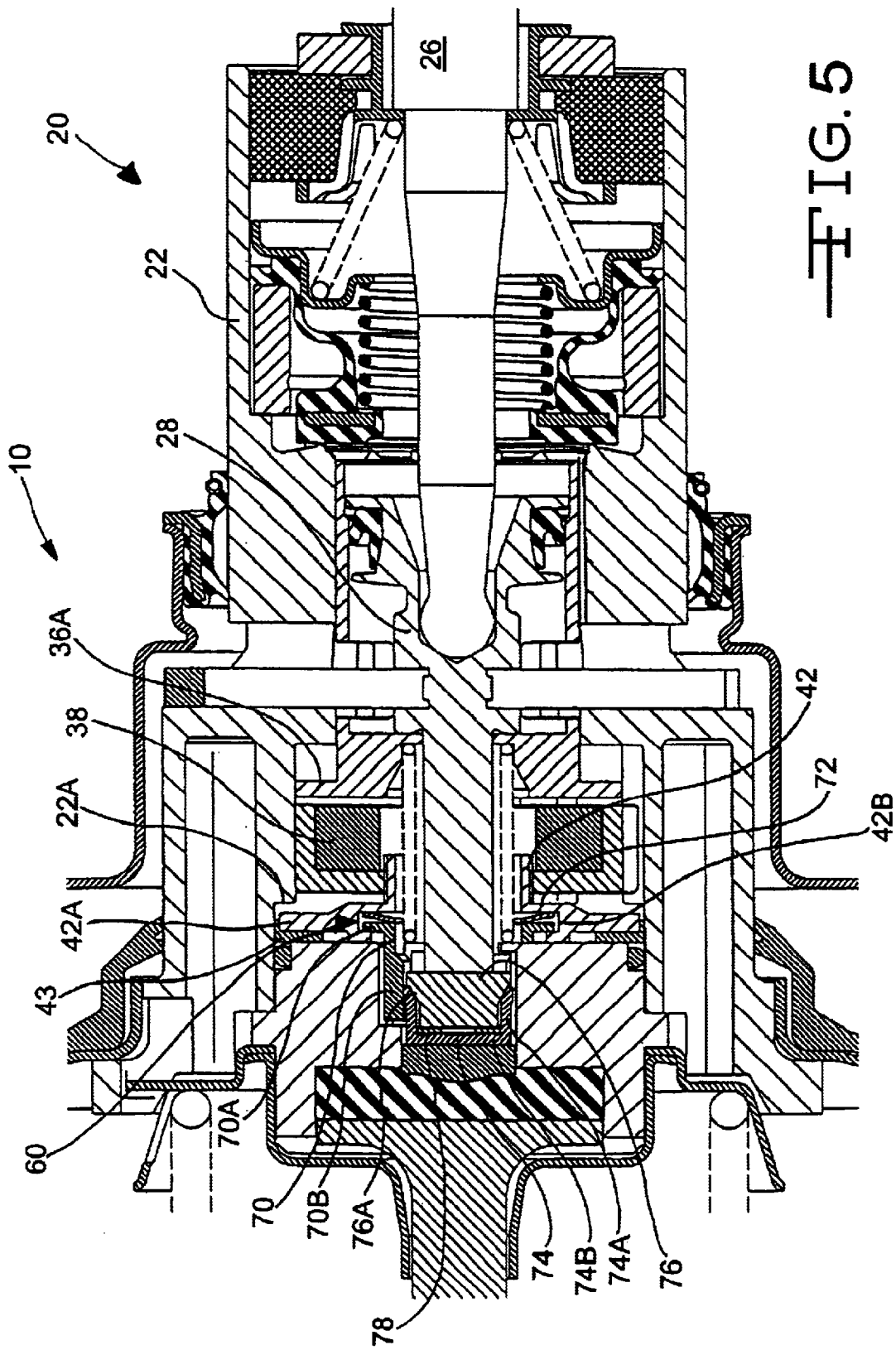
FIG. 5 the control valve of FIG. 1 after the full-output point is exceeded, with the coupling device activated.

If, as shown in FIG. 5, the actuating force summoned up by the driver is further increased and the full-output pressure exceeded, the actuating piston 28 does in fact continue to move in actuating direction but the distance between armature 36A and permanent magnet 38 cannot be reduced further because the permanent magnet 38 is also rigidly coupled to the actuating piston 28. Instead, the flange-shaped portion of enlarged diameter 42A of the holding device 42 moves out of contact with the stop 22A of the control valve housing 22 and the resilient element 43 is deformed. An inappropriate activation of the emergency braking aid is ruled out.

When, from the operating position shown in FIG. 5, the brake is released by reducing the actuating force summoned up by the driver, the then relieved resilient element 78 pushes the conical component 76 and the clamping element 74 apart. The clamping action between clamping element 74 and extension 70 is cancelled and the permanent magnet 38 is uncoupled from the actuating piston 28.

Figure 6:
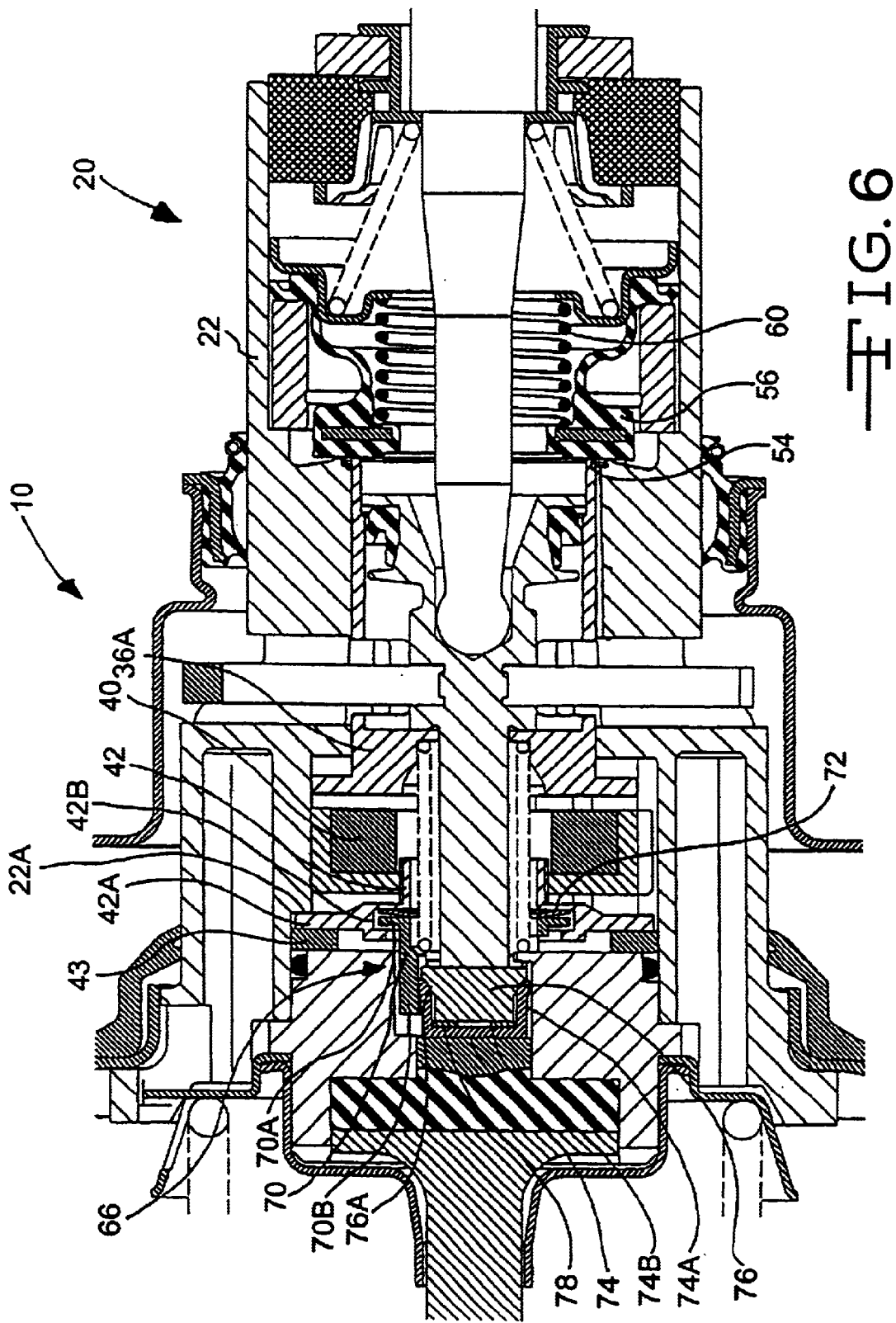
FIG. 6 the control valve according to FIG. 1 in a partial braking position, with the coupling device activated.

In the so-called partial braking position of the brake booster 10 shown in FIG. 6, the opened valve seat 54 is closed by the reaction forces of the master brake cylinder while the actuating force summoned up by the driver remains the same. The position of equilibrium arises.

If in the partial braking position the coupling device was already activated, i.e. the fingers 74A are already clamping the portion 70B of the extension 70, given an integral construction of extension 70 and holding device 42, the reaction forces of the master brake cylinder needed to close the valve seat 54 would be introduced entirely into the control valve housing 22 via the flange-shaped portion of enlarged diameter 42A of the holding device 42. In that case, the valve seat 54 could not be closed by the reaction forces of the master brake cylinder and a position of equilibrium would be unattainable.

In order nevertheless to enable attainment of the position of equilibrium in the partial braking position, holding device 42 and extension 70 are designed as separate and mutually displaceable components. As already mentioned above, the extension 70 may be displaced counter to the actuating direction relative to the holding device 42 through deformation of the resilient element 43 disposed in the groove 42B of the holding device 42. The reaction forces of the master brake cylinder may therefore at least partially retroact upon the actuating piston 28 even when the coupling device is activated. Via the spring 58 the reaction forces are then transmitted from the actuating piston 28 to the valve sleeve 36B, with the result that the valve seat 54 is closed.

Figure 7:
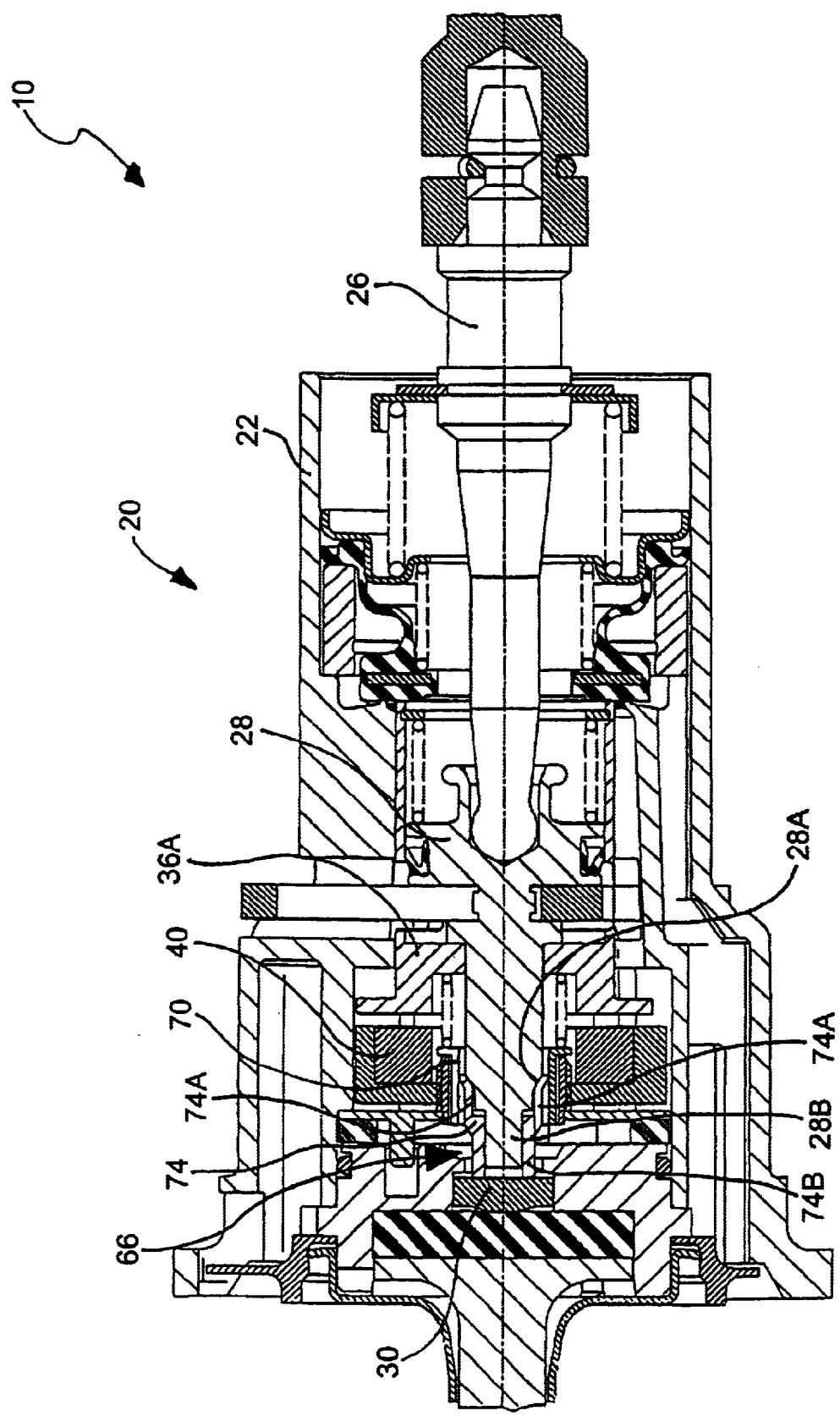
FIG. 7 a longitudinal section through the control valve of a second embodiment of a vacuum brake booster according to the invention.

FIG. 7 shows a second embodiment of a vacuum brake booster 10 according to the invention, i.e. actually the control valve 20 of this vacuum brake booster 10. As regards the function, the vacuum brake booster 10 according to the second embodiment is essentially identical with the vacuum brake booster described with reference to FIGS. 1 to 6. In the vacuum brake booster according to the second embodiment, however, the conical component 76 of FIG. 1 has been omitted. An advantage of this omission is the considerably reduced axial extension of the coupling device 66. The result of this reduced axial extension is that no assembly space is required within the control valve housing larger than is the case with a control valve housing of a conventional type, i.e. without emergency braking aid. Moreover, the coupling device 66 illustrated in FIG. 7 can be manufactured cheaper due to the fact that the conical component is omitted.

In the vacuum brake booster 10 illustrated in FIG. 7 the function of the conical component is assumed by the actuating piston 28. To this end, the actuating piston 28 is provided at its end facing the sensing disk 30 with sloping surfaces embodied by a conical section 28a. The actuating piston 28 cooperates with the clamping fingers 74a of the clamping element by means of said sloping surfaces 28a.

The clamping element 74 includes a hollow-cylindrical carrier member 74b which surrounds a portion of reduced diameter 28b of the actuating piston 28 radially at the outside and is guided on the portion of reduced diameter 28 so as to be displaceable in longitudinal direction. In the operating position of the vacuum brake booster 10 illustrated in FIG. 7 the hollow-cylindrical carrier member 74b rests with its end against the surface of the sensing disk 30 facing the input element 26. The clamping fingers 74a are arranged in the area of its other end.

When the actuating piston 28 is slowly displaced in the actuating direction, the clamping fingers 74a are urged radially outwardly by the conical portion 28a of the actuating piston 28, owing to the high reaction forces introduced by the sensing disk 30 into the carrier member 74b. At the same time, the clamping fingers 74 make a clamping connection with the coupling cylinder 70 surrounding the clamping fingers 74a radially at the outside. As a result of this clamping connection, the actuating piston 28 is coupled in the actuating direction via its conical section 28a, the clamping fingers 74a and the coupling cylinder 70 to the permanent magnet 40. The axial distance between the armature 36a and the permanent magnet 40 cannot be reduced any further owing to this coupling of the actuating piston 28 to the permanent magnet 40.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A brake booster, comprising
   a vacuum chamber and a working chamber separated from each other by a movable wall,
   a control valve, which comprises a control valve housing coupled workingly to the movable wall and which is capable of controlling the supply of atmospheric pressure or above-atmospheric pressure to the working chamber to achieve a pressure difference at the movable wall,
   an emergency braking aid comprising a permanent magnet disposed in the control valve housing, and an armature, which cooperates with the permanent magnet and in the event of emergency braking is drawn into abutment with the permanent magnet, with the result that the control valve is held open for the supply of atmospheric pressure or above-atmospheric pressure to the working chamber, wherein the permanent magnet and the armature form a two-component magnetic module, of which a first component is coupled to an actuating piston in actuating direction of the brake booster, and
   a coupling device for coupling the second component of the magnetic module at least in the actuating direction of the brake booster, to the actuating piston, wherein reaction forces acting counter to the actuating direction of the brake booster are introduced into the coupling device at least in non-emergency braking situations, to cause coupling of the second component of the magnetic module, at least in actuating direction of the brake booster, to the actuating piston.

2. The brake booster according to claim 1, wherein the coupling device includes a clamping joint.

3. The brake booster according to claim 1, wherein the coupling device comprises a clamping element, which is deformable radially outwards relative to a longitudinal axis of the control valve housing.

4. The brake booster according to claim 3, wherein the clamping element comprises several fingers, which extend parallel to a longitudinal axis and all of which concentrically surround the longitudinal axis.

5. The brake booster according to claim 4, wherein the end of each finger facing the vacuum chamber is connected to a common carrier part which, in actuating direction of the brake booster, is disposed functionally downstream of the actuating piston.

6. The brake booster according to claim 3, wherein the actuating piston is provided with sloping surfaces radially at the outside and cooperates with the clamping element via said sloping surfaces.

7. The brake booster according to claim 3, wherein the coupling device comprises a component, which is provided with sloping surfaces and which at least via said sloping surfaces cooperates with the clamping element.

8. The brake booster according to claim 7, wherein a first resilient element is disposed between the clamping element and the component provided with sloping surfaces.

9. The brake booster according to claim 7, wherein the control valve housing has a stop, which cooperates with the component provided with sloping surfaces upon displacement of the latter counter to actuating direction.

10. The brake booster according to claim 3, wherein the coupling device comprises an extension, which at least in actuating direction cooperates with the second component of the magnetic module and has a portion radially surrounding the outside of the clamping element at least in sections and cooperating with the clamping element.

11. The brake booster according to claim 10, wherein the extension is preloaded in actuating direction relative to the second component of the magnetic module.

12. The brake booster according to claim 1, wherein the second component of the magnetic module is connected in an axially adjustable manner to a holding device.

13. The brake booster according to claim 12, wherein a second resilient element is provided, which preloads the holding device counter to the actuating direction towards the control valve housing.

14. The brake booster according to claim 13, wherein the holding device has a groove open in a radially inward direction into which a collar of the extension projects.

15. The brake booster according to claim 14, wherein in the groove a third resilient element is disposed between a side surface of the groove facing the vacuum chamber and an opposing end face of the collar of the extension.

16. The brake booster according to claim 12, wherein the connection of holding device and extension allows a relative displacement in axial direction.

17. The brake booster according to claim 16, wherein the holding device is connected to the extension rigidly counter to the actuating direction and resiliently in the actuating direction.

* * * * *